US009778550B2

(12) United States Patent
Schuh

(10) Patent No.: US 9,778,550 B2
(45) Date of Patent: Oct. 3, 2017

(54) SHORT THROW PROJECTOR MOUNT WITH MICRO-ADJUST FEATURE

(71) Applicant: MILESTONE AV TECHNOLOGIES LLC, Eden Prairie, MN (US)

(72) Inventor: Mathew Schuh, Chanhassen, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 14/440,191

(22) PCT Filed: Mar. 11, 2013

(86) PCT No.: PCT/US2013/030236
§ 371 (c)(1),
(2) Date: May 1, 2015

(87) PCT Pub. No.: WO2014/070226
PCT Pub. Date: May 8, 2014

(65) Prior Publication Data
US 2015/0277214 A1 Oct. 1, 2015

Related U.S. Application Data

(60) Provisional application No. 61/722,691, filed on Nov. 5, 2012.

(51) Int. Cl.
G03B 21/14 (2006.01)
G03B 21/54 (2006.01)
(Continued)

(52) U.S. Cl.
CPC .......... *G03B 21/145* (2013.01); *F16M 11/00* (2013.01); *F16M 11/048* (2013.01);
(Continued)

(58) Field of Classification Search
CPC ... E16M 13/02; F16M 11/048; F16M 13/022; F16M 11/00; F16M 11/125;
(Continued)

(56) References Cited

U.S. PATENT DOCUMENTS 1,812,369 A    6/1931  Porter et al.
3,444,560 A *  5/1969  Northup, Jr. .......... A42B 3/145
                                                    2/8.1
(Continued)

FOREIGN PATENT DOCUMENTS

KR  10-2003-0082872 A  10/2003
WO  WO 2009/152446 A1  12/2009
WO  WO 2011/019402 A1  2/2011

OTHER PUBLICATIONS

International Search Report and Written Opinion for International Application No. PCT/US2013/030236, dated Aug. 12, 2013, 11 pages.
(Continued)

*Primary Examiner* — Adriana Figueroa
*Assistant Examiner* — Jessie T Fonseca
(74) *Attorney, Agent, or Firm* — Patterson Thuente Pedersen, P.A.

(57) ABSTRACT

A short throw projector mount enabling a finely tuned distance adjustment and/or finely tuned height adjustment of an attached projector. The mount includes a wall interface, a projector positioning head, and an elongate arm operably coupling the wall interface and the projector positioning head. A first end of the arm is coupled to the wall interface, and the projector positioning head is operably coupled proximate an opposing second end of the arm such that the projector positioning head is shiftable along a longitudinal axis of the arm. The arm further includes a positioning mechanism arranged to selectively drive shifting of the
(Continued)

projector positioning head. A vertical positioning mechanism may be provided to shift the projector vertically relative to the wall interface.

16 Claims, 9 Drawing Sheets

(51) Int. Cl.
*F16M 13/02* (2006.01)
*H04N 5/74* (2006.01)
*F16M 11/04* (2006.01)
*F16M 11/12* (2006.01)
*F16M 11/00* (2006.01)

(52) U.S. Cl.
CPC ........ *F16M 11/125* (2013.01); *F16M 13/022* (2013.01); *G03B 21/54* (2013.01); *H04N 5/74* (2013.01); *F16M 2200/025* (2013.01); *F16M 2200/08* (2013.01)

(58) Field of Classification Search
CPC ......... F16M 2200/08; F16M 2200/025; G03B 21/145; G03B 21/54; H04N 5/74
USPC ... 248/279.1, 317, 323, 287.1, 286.1, 285.1, 248/292.12, 298.1, 292.14, 917
See application file for complete search history.

(56) References Cited

U.S. PATENT DOCUMENTS

| | | |
|---|---|---|
| 6,523,799 B2 | 2/2003 | Su |
| D623,679 S | 9/2010 | Dittmer |
| D623,680 S | 9/2010 | Dittmer |
| 8,297,578 B2 | 10/2012 | Dittmer et al. |
| 2001/0000300 A1 | 4/2001 | Haile-mariam |
| 2004/0005798 A1 | 1/2004 | Lin |
| 2007/0257178 A1* | 11/2007 | Dittmer ................. F16M 11/04 248/519 |
| 2009/0294619 A1 | 12/2009 | David |
| 2010/0321646 A1* | 12/2010 | Nakano ................. G03B 21/14 353/119 |
| 2011/0051099 A1* | 3/2011 | Chen ..................... G03B 21/14 353/79 |
| 2011/0163212 A1* | 7/2011 | Bouissiere ........... F16M 11/048 248/215 |
| 2012/0032046 A1* | 2/2012 | Lee ..................... F16M 11/123 248/285.1 |
| 2012/0037776 A1* | 2/2012 | Hung .................... F16M 11/08 248/282.1 |
| 2013/0048819 A1* | 2/2013 | Hung .................... F16M 11/12 248/286.1 |

OTHER PUBLICATIONS

PCT Notification Concerning Transmittal of International Preliminary Report on Patentability, International Preliminary Report on Patentability, and Written Opinion of the International Searching Authority for PCT/US2013/030236, dated May 14, 2015, 8 Pgs.

Extended European Search Report for co-pending Application No. 13850449.3, dated May 17, 2016 (7 pgs).

* cited by examiner

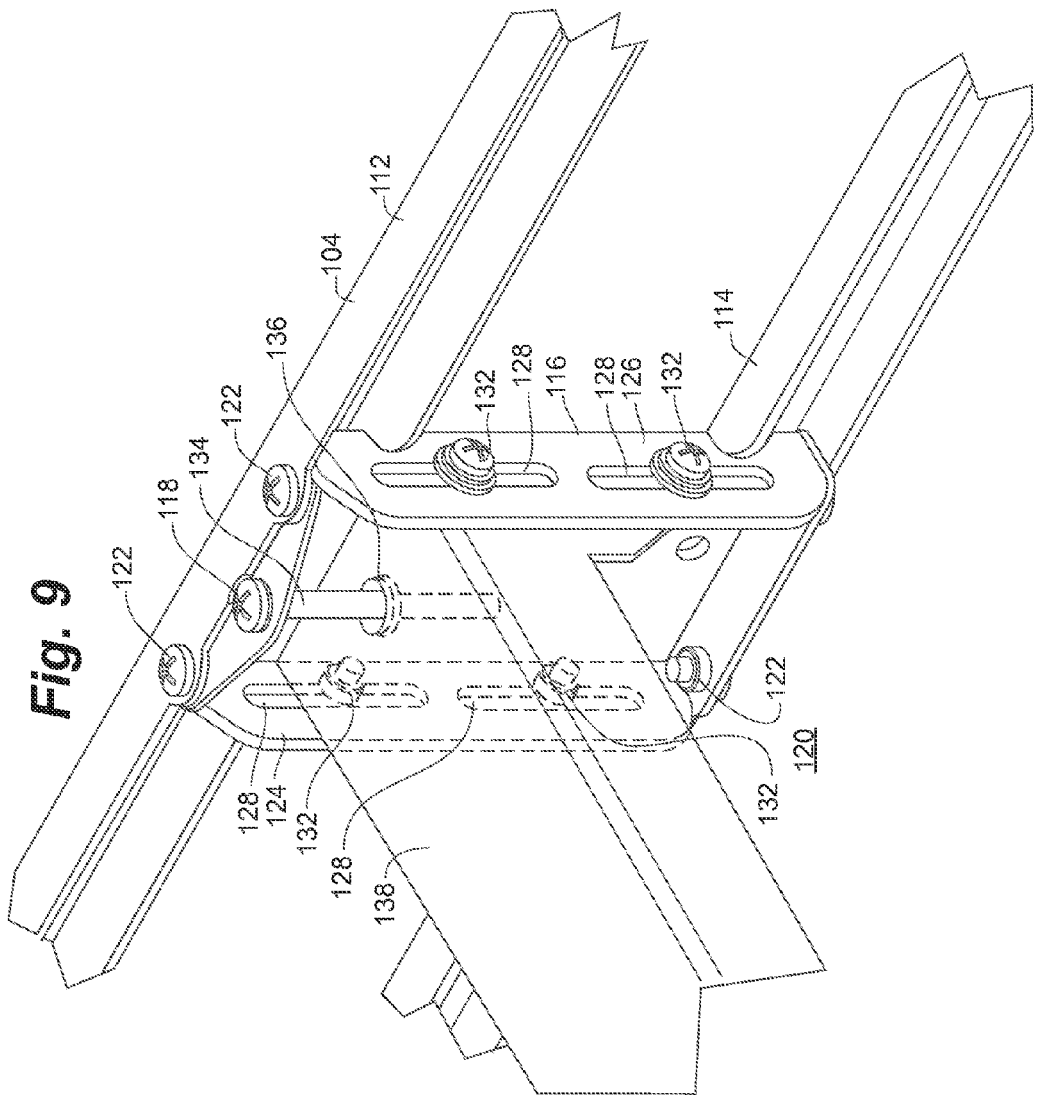

SHORT THROW PROJECTOR MOUNT WITH MICRO-ADJUST FEATURE

RELATED APPLICATIONS

This application is a National Phase entry of PCT Application No. PCT/US2013/030236 filed Mar. 11, 2013, and entitled ARTICULATING MOUNT FOR FLAT PANEL DISPLAY, which application claims the benefit of priority to U.S. Provisional Patent Application No. 61/722,691 filed Nov. 5, 2012, and entitled ARTICULATING MOUNT FOR FLAT PANEL DISPLAY, the entire disclosures of which are incorporated herein by reference.

FIELD OF THE INVENTION

The present invention relates to mounting projection devices, and more specifically to mounts for short throw projectors.

BACKGROUND OF THE INVENTION

Short throw projection devices mounted from walls or a projection surface are commonly used to facilitate presentations to groups of people. Some examples of prior mounts for short throw projectors are disclosed in U.S. Design Pat. Nos. D623,679 and D623,680, hereby fully incorporated herein by reference.

It is advantageous that mounts for projection devices provide for finely tuned adjustment of projector position in order to ensure that the projector is properly aimed relative to the projection screen. An example of a projector mount providing such finely tunable position adjustment is disclosed in U.S. Pat. No. 8,297,578, hereby fully incorporated herein by reference.

For short throw projectors in particular, however, it is desirable to provide for adjustment of the distance of the projector relative to the screen, as well as adjustment for vertical projector height relative to the projection screen. While prior devices generally enable course adjustment of projector distance from the screen, the mechanisms in these devices usually require loosening of one or more fasteners, careful adjustment of the mount and projector position, and re-tightening of the fasteners to frictionally hold the device in the adjusted position. It is difficult for an installer to hold a heavy projection in the proper position while effecting the re-tightening, and often the act of tightening the fasteners causes a shift in the projector position, resulting in further attempts at adjustment or less than optimal projector positioning. As for height adjustability, prior mounts are usually fixed in height and cannot easily be repositioned without removal and reinstallation of the mount.

What is needed is a short throw projector mount that provides finely tuned distance adjustment and/or finely tuned height adjustment.

SUMMARY OF THE INVENTION

A short throw projector mount according to embodiments of the invention addresses the need of the industry for finely tuned distance adjustment and/or finely tuned height adjustment.

According to an embodiment, a mount for a projector includes a wall interface, a projector positioning head, and an elongate arm operably coupling the wall interface and the projector positioning head. A first end of the arm is coupled to the wall interface, and the projector positioning head is operably coupled proximate an opposing second end of the arm such that the projector positioning head is shiftable along a longitudinal axis of the arm. The arm further includes a positioning mechanism arranged to selectively drive shifting of the projector positioning head.

According to an embodiment, the positioning mechanism includes a gear rotatably coupled to the projector positioning head, the gear defining a plurality of teeth. The arm defines an elongate slot, an edge of the slot defining a plurality of gear teeth, the teeth of the gear engaged with the gear teeth defined in the edge of the slot, wherein the projector positioning head shifts along the elongate arm as the gear is rotated.

In an embodiment, the projector positioning head comprises a carrier, a first bracket operably coupled to the carrier such that the first bracket is rotatable about a first axis, and a second bracket operably coupled to the first bracket such that the second bracket is rotatable about a second axis oriented transverse to the first axis. The projector positioning head can further include a second positioning mechanism arranged to selectively drive rotation of the first bracket about the first axis, and a third positioning mechanism arranged to selectively drive rotation of the second bracket about the second axis.

In a further embodiment, the projector positioning head can further include a third bracket operably coupled to the second bracket such that the third bracket is rotatable about a third axis oriented transverse to both the first axis and the second axis. The projector positioning head can include a fourth positioning mechanism arranged to selectively drive rotation of the third bracket about the third axis.

In an embodiment, the mount further includes a vertical positioning mechanism operably coupled to the arm and the wall interface, the vertical positioning mechanism arranged to selectively vertically shift the arm relative to the wall interface.

In an embodiment, a projector system includes a projector, and a mount for attaching the projector to a wall. The mount includes a wall interface, a projector positioning head attached to the projector, and an elongate arm operably coupling the wall interface and the projector positioning head. A first end of the arm is coupled to the wall interface, and the projector positioning head is operably coupled proximate an opposing second end of the arm such that the projector positioning head is shiftable along a longitudinal axis of the arm. The arm further includes a positioning mechanism arranged to selectively drive shifting of the projector positioning head.

According to a further embodiment, a mount for a projector includes a wall interface, a projector positioning head, and an elongate arm operably coupling the wall interface and the projector positioning head. A first end of the arm is coupled to the wall interface, and the projector positioning head is operably coupled proximate an opposing second end of the arm such that the projector positioning head is shiftable along a longitudinal axis of the arm. The arm further includes a positioning mechanism arranged to selectively drive shifting of the projector positioning head. The projector positioning head includes a carrier, a pitch bracket operably coupled to the carrier such that the pitch bracket is rotatable about a pitch axis, and a roll bracket operably coupled to the pitch bracket such that the roll bracket is rotatable about a roll axis oriented transverse to the pitch axis.

In an embodiment, the projector positioning head can further include a second positioning mechanism arranged to selectively drive rotation of the pitch bracket about the pitch axis, and a third positioning mechanism arranged to selectively drive rotation of the roll bracket about the roll axis. The positioning mechanism can include a gear rotatably coupled to the carrier, the gear defining a plurality of teeth. The arm can define an elongate slot, an edge of the slot defining a plurality of gear teeth, the teeth of the gear engaged with the gear teeth defined in the edge of the slot, wherein the projector positioning head shifts along the elongate arm as the gear is rotated.

BRIEF DESCRIPTION OF THE DRAWINGS

The embodiments of the present invention may be more completely understood in consideration of the following detailed description of various embodiments in connection with the accompanying drawings, in which:

FIG. 9 is a fragmentary front isometric view of the projector mount of FIG. 1 with the extension arm depicted in phantom to better depict the vertical height adjustment feature of the device.

Figure 1:
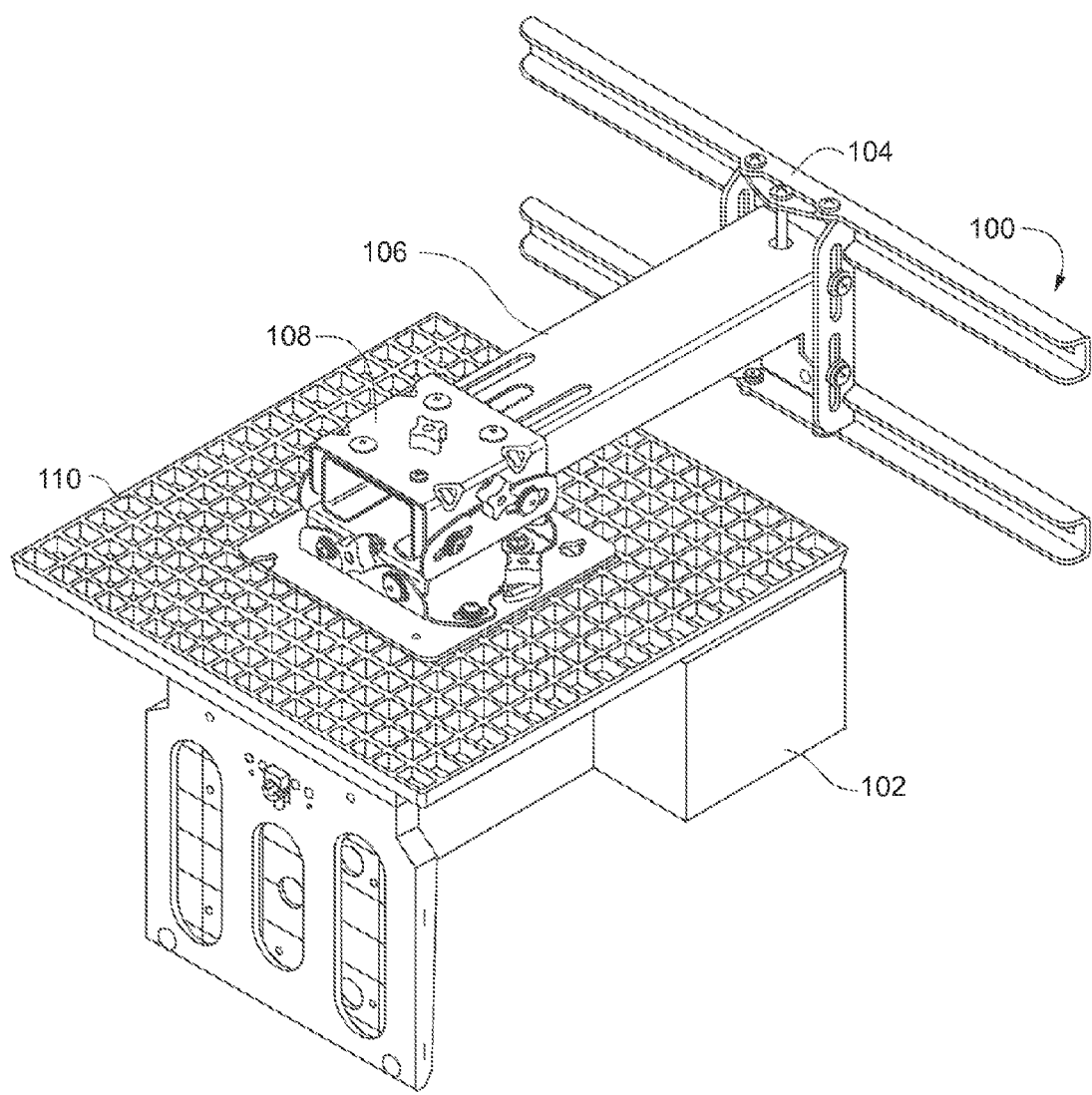
FIG. 1 is a top front isometric view of a short throw projector mount according to an embodiment of the invention with an attached projector.
Figure 2:
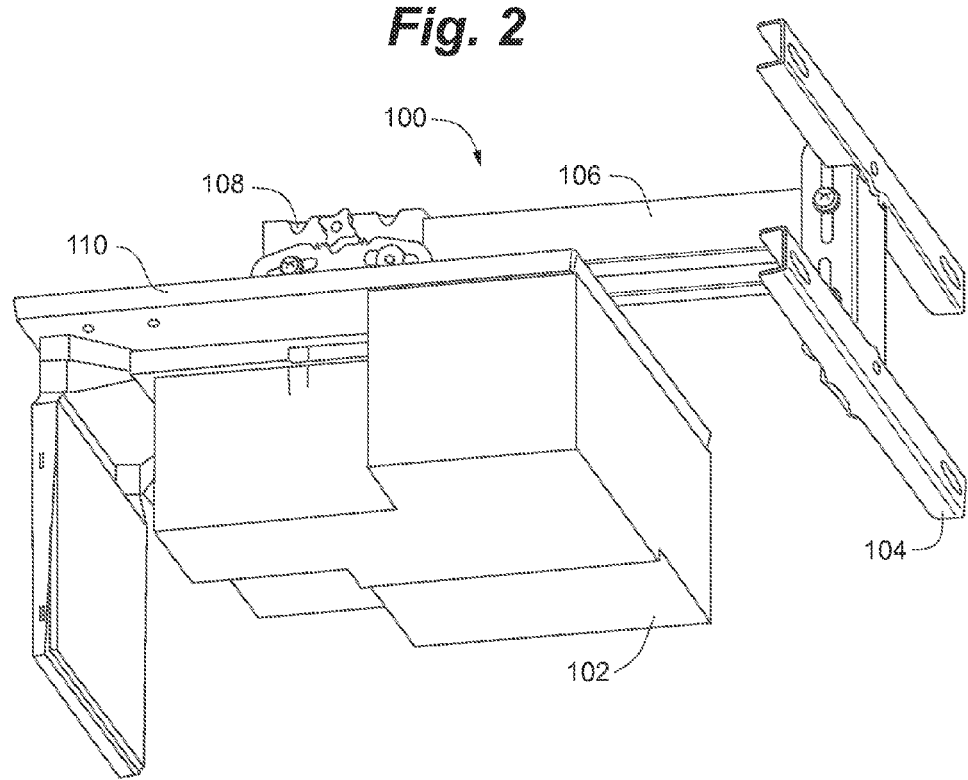
FIG. 2 is a bottom rear isometric view of the short throw projector mount of FIG. 1.
Figure 3:
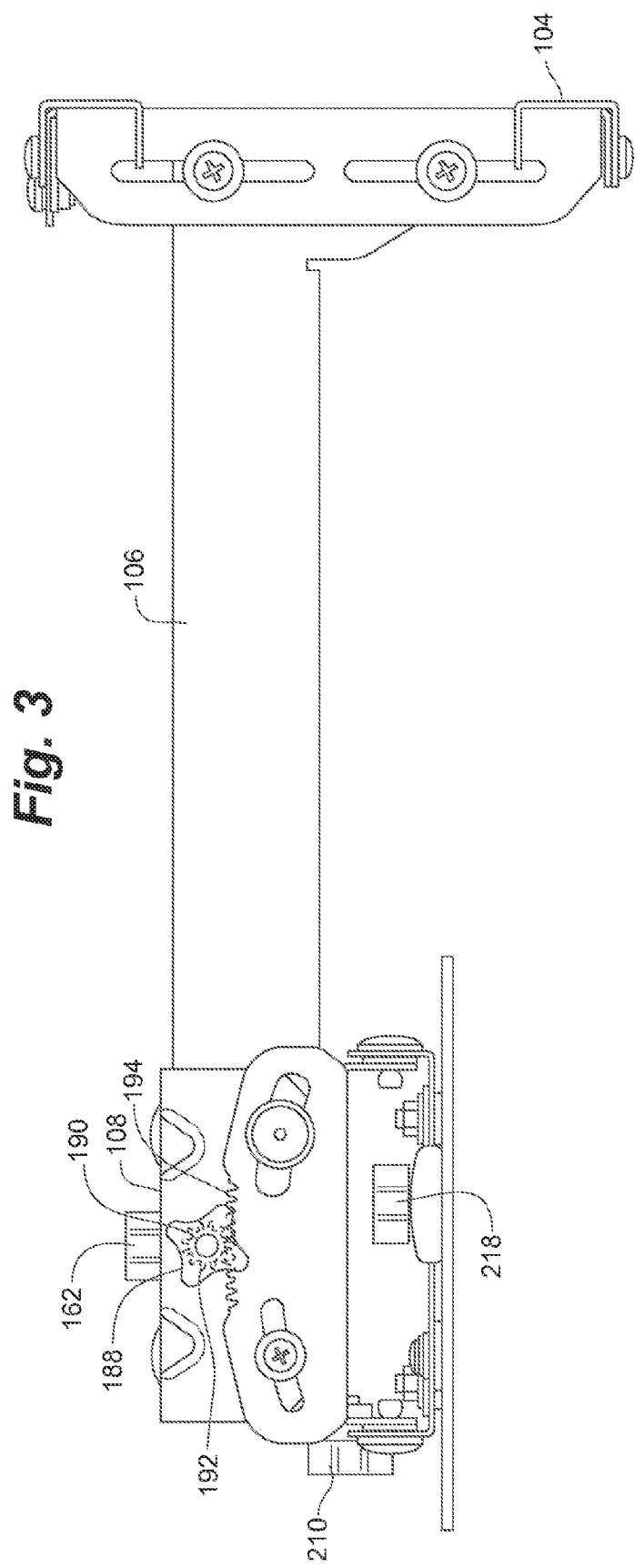
FIG. 3 is a side elevation view of the mount of FIG. 1 with some components shown in phantom for clarity.
Figure 4:
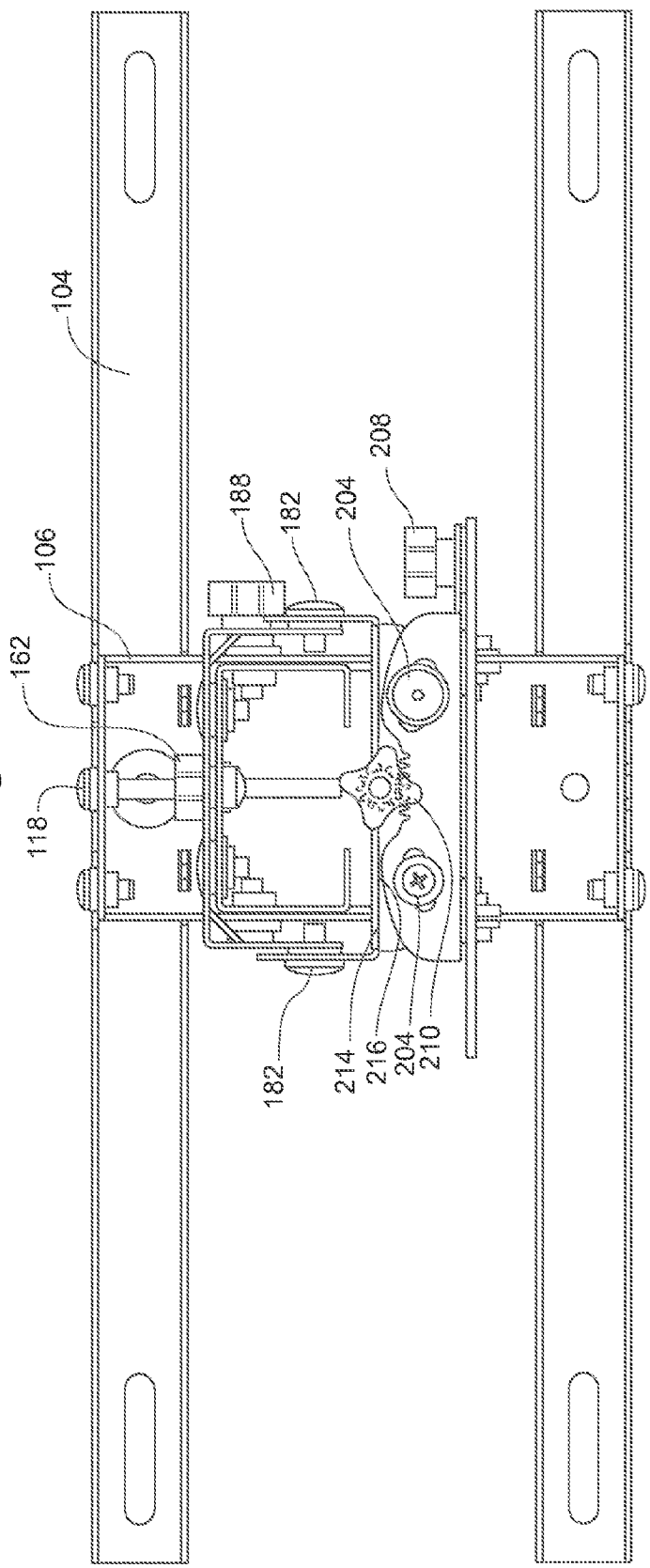
FIG. 4 is a front elevation view of the mount of FIG. 1 with some components shown in phantom for clarity.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

There is depicted in FIGS. 1-9 a mount 100 for short throw projector 102 according to an embodiment of the present invention. Mount 100 generally includes wall interface assembly 104, extension arm 106, projector positioning head 108, and egg crate mounting plate 110.

Wall interface assembly 104 as depicted in FIG. 9 generally includes horizontal brackets 112, 114, vertical bracket 116, and vertical positioner 118. Horizontal brackets 112, 114 attach to vertical wall 120 with fasteners (not depicted). Vertical bracket 116 extends between horizontal brackets 112, 114, and is rigidly attached to each with fasteners 122. Vertical bracket 116 generally includes forwardly extending side flanges 124, 126, each defining guide slots 128. Vertical bracket 116 also presents forwardly extending flange 130, which receives vertical positioner 118 through an aperture defined therein, such that vertical positioner 118 is freely rotatable therein. Extension arm 106 is secured to vertical bracket 116 with fasteners 132 through guide slots 128, such that fasteners 132 are slidable in guide slots 128. Vertical positioner 118 generally includes threaded bolt 134 and nut 136, which is positioned below the top wall 138 of extension arm 106. As threaded bolt 134 is rotated, nut 136 threads on bolt 134, thereby shifting the vertical position of extension arm 106 up or down relative to horizontal brackets 112, 114, the direction of movement depending on the rotational direction imparted to threaded bolt 134.

Figure 5:
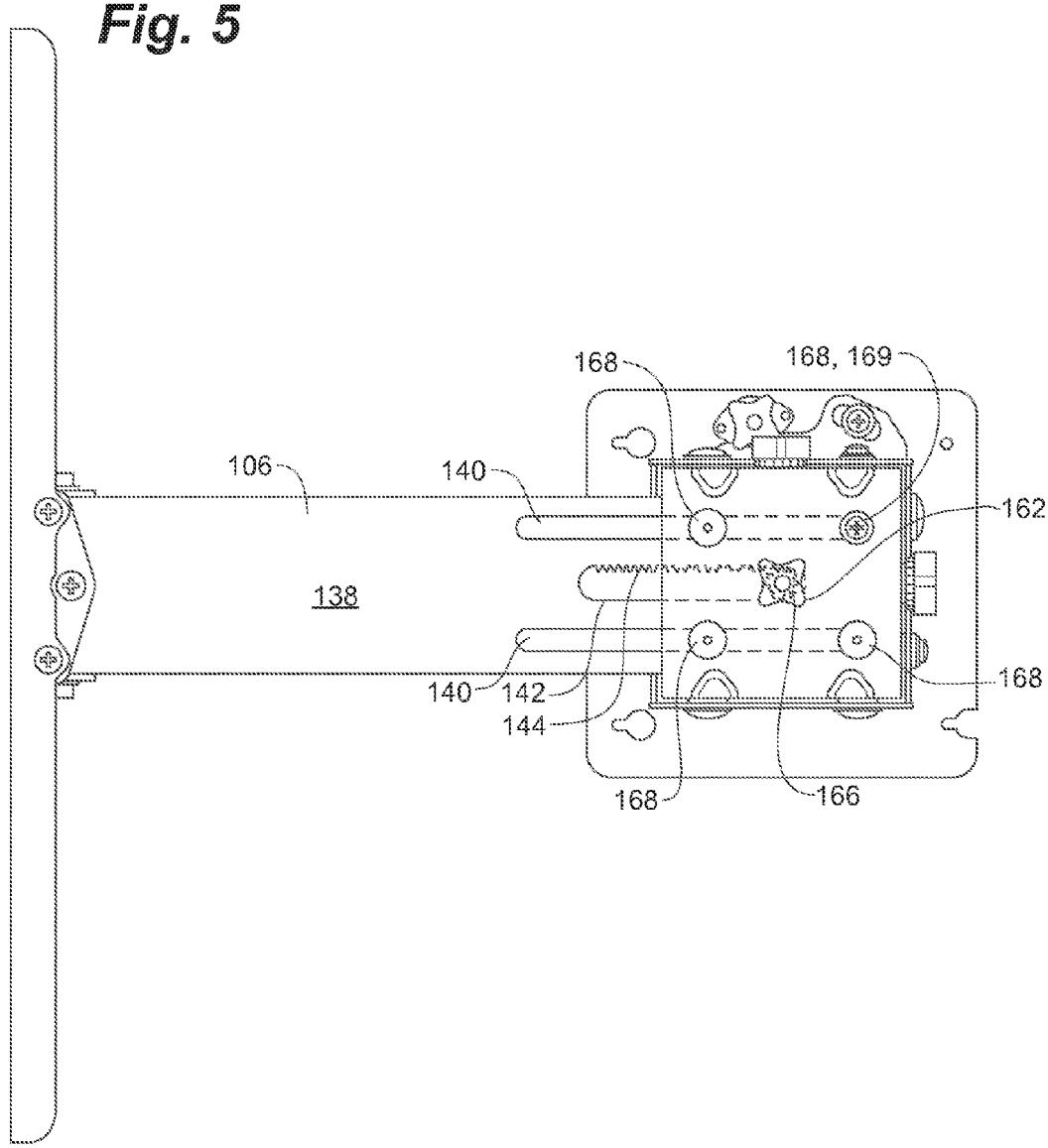
FIG. 5 is top plan view of the mount of FIG. 1 with some components shown in phantom for clarity.

Extension arm 106 can be formed as a generally c-shaped channel with the open side (opposite top wall 138) facing downward. As depicted in FIG. 5, top wall 138 defines guide slots 140 and positioning slot 142. Positioning slot 142 has gear teeth 144 defined in one edge thereof.

Figure 6:
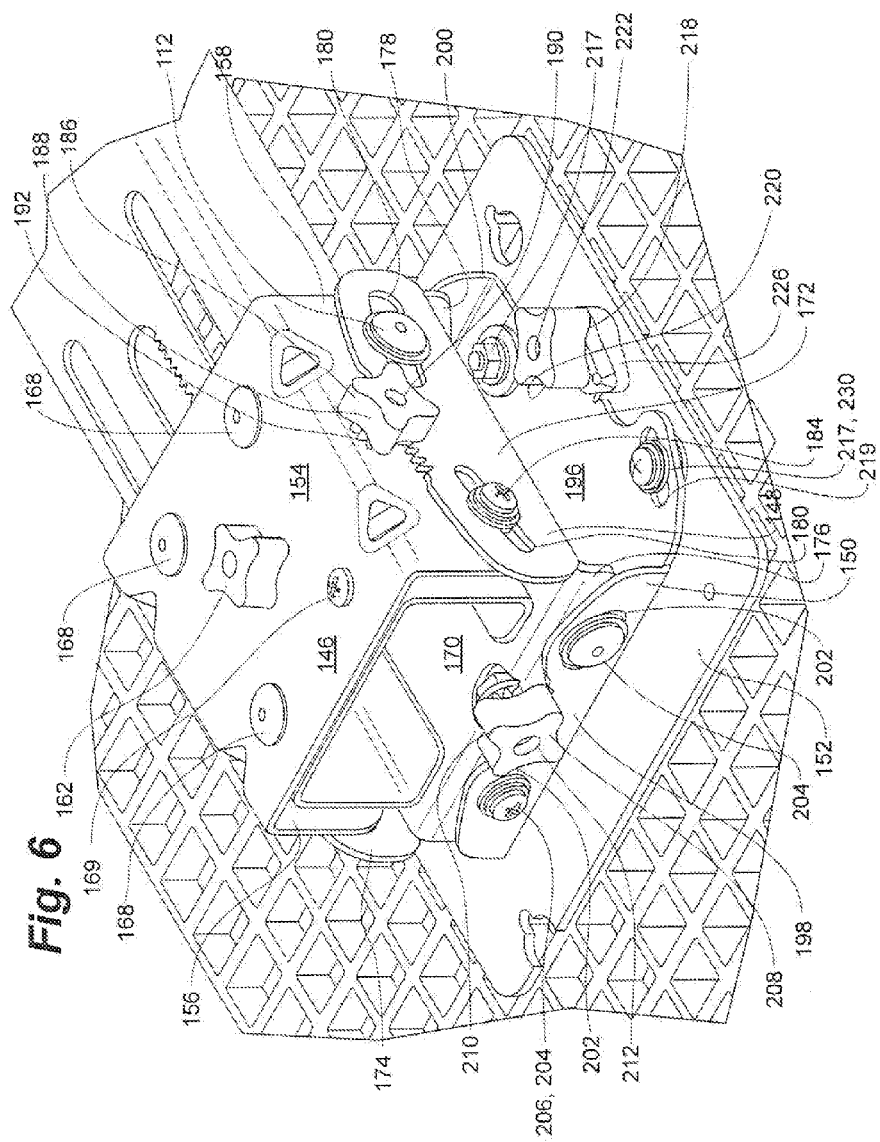
FIG. 6 is a top front isometric view of the of the projector positioning head of the mount of FIG. 1.
Figure 7:
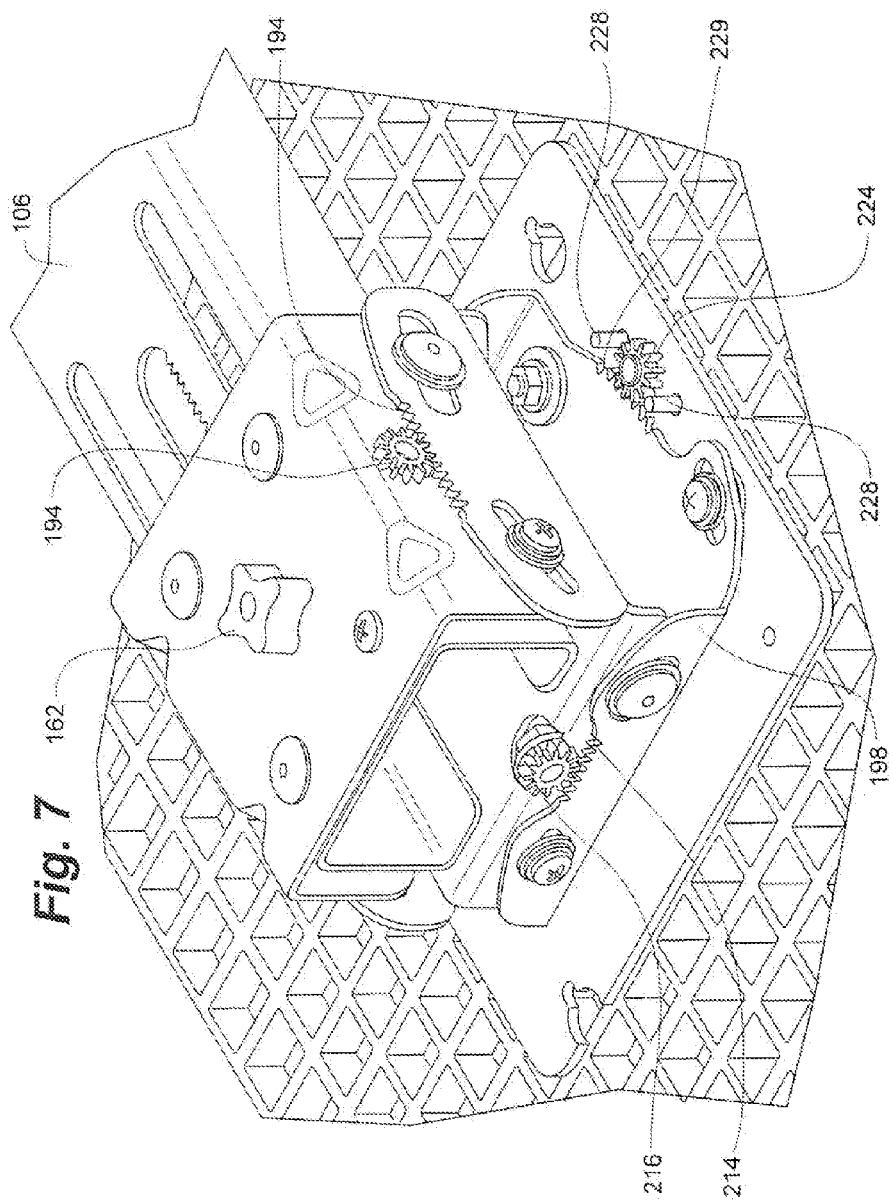
FIG. 7 is a top front isometric view of the of the projector positioning head of the mount of FIG. 1 with yaw, pitch, and roll positioning knobs omitted for clarity.
Figure 8:
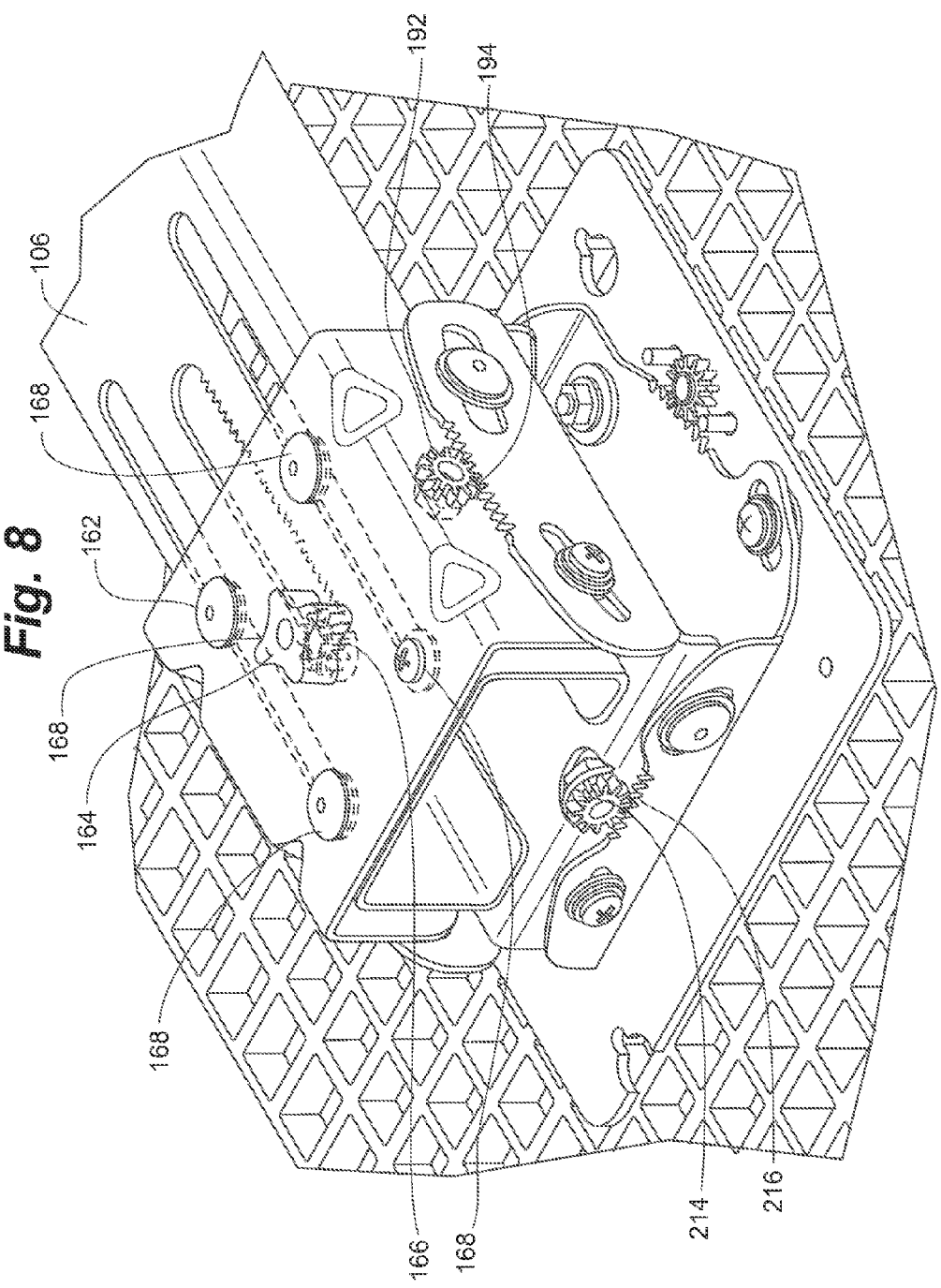
FIG. 8 is a top front isometric view of the of the projector positioning head of the mount of FIG. 1 with yaw, pitch, and roll positioning knobs omitted for clarity and with a portion of the head depicted in phantom to better depict the fine distance adjustment feature of the device.

As depicted in FIGS. 6-8, projector positioning head 108 generally includes carrier bracket 146, pitch bracket 148, roll bracket 150, and yaw plate 152. Carrier bracket 146 generally includes horizontal top plate portion 154 and downwardly extending flanges 156, 158. As depicted in FIG. 8, distance positioning control 160 is rotatably received through an aperture defined in top plate portion 154, and generally includes knob 162, which is fixed to shaft 164, which in turn is fixed to gear 166. Teeth defined in gear 166 are meshed with gear teeth 144 of positioning slot 142 of extension arm 106. Carrier bracket 146 is fastened to extension arm 106 with fasteners 168 extending through guide slots 140 such that carrier bracket 146 is longitudinally slidable on extension arm 106. It will be appreciated that at least one 169 of fasteners 168 may be selectively adjustable as to tightness so as to add or remove friction from the sliding connection between carrier bracket 146 and extension arm 106 as desired. As knob 162 is rotated, gear 166 rotates, and due to the meshing of gear 166 with gear teeth 144, carrier bracket 146 translates along extension arm 106, thereby finely adjusting the distance of a projector 102 coupled with projector positioning head 108 relative to a projection screen on wall 120.

Pitch bracket 148 generally includes plate 170 with upwardly extending side flanges 172, 174, and downwardly extending flanges 176, 178. Upwardly extending side flanges 172, 174, define arcuate guide slots 180.

Carrier bracket 146 is secured to pitch bracket 148 with fasteners 182 through guide slots 180 such that pitch bracket 148 is shiftable relative to carrier bracket 146 and extension arm 106 in an arcuate path defined by guide slots 180, thereby providing fore-and-aft pitch adjustment for projector 102. It will be appreciated that, with proper tolerances, guide slots 180 may be straight or other shape, so long as generally arcuate pitching motion of pitch bracket 148 relative to carrier bracket 146 is facilitated. It will also be appreciated that guide slots 180 could be replaced with other guide structures such as closed channels while remaining within the scope of the invention. At least one 184 of fasteners 182 may be selectively adjustable as to tightness so as to add or remove friction from the sliding connection between carrier bracket 146 and pitch bracket 148 as desired. Pitch adjustment control 186 generally includes knob 188, which is fixed to shaft 190, which in turn is fixed to gear 192. As depicted in FIG. 7, gear 192 is meshed with gear teeth 194 defined in the top edge of upwardly extending flange 172. As knob 188 is rotated, gear 192 rotates, and due to the meshing of gear 192 with gear teeth 194, pitch bracket 148 shifts along the arcuate path defined by arcuate guide slots 180, thereby finely adjusting the pitch position of a projector 102 coupled with projector positioning head 108 relative to a projection screen on wall 120.

Roll bracket 150 generally includes plate portion 196 with upwardly extending flanges 198, 200. Upwardly extending flanges 198, 200, define arcuate guide slots 202.

Pitch bracket 148 is secured to roll bracket 150 with fasteners 204 through guide slots 202 such that roll bracket 150 is shiftable relative to pitch bracket 148 and extension arm 106 in an arcuate path defined by guide slots 202, thereby providing side-to-side roll adjustment for projector 102. It will be appreciated that, with proper tolerances, guide slots 202 may be straight or other shape, so long as generally arcuate rolling motion of roll bracket 150 relative to pitch bracket 148 is facilitated. It will also be appreciated that guide slots 202 could be replaced with other guide structures such as closed channels while remaining within the scope of the invention. At least one 206 of fasteners 204 may be selectively adjustable as to tightness so as to add or remove friction from the sliding connection between pitch bracket 148 and roll bracket 150 as desired. Roll adjustment control 208 generally includes knob 210, which is fixed to shaft 212, which in turn is fixed to gear 214. As depicted in FIG. 7, gear 214 is meshed with gear teeth 216 defined in the top edge of upwardly extending flange 198. As knob 210 is rotated, gear 214 rotates, and due to the meshing of gear 214 with gear teeth 216, roll bracket 150 shifts along the arcuate path defined by arcuate guide slots 202, thereby finely adjusting the roll position of a projector 102 coupled with projector positioning head 108 relative to a projection screen on wall 120.

Yaw plate 152 is to roll bracket 150 with fasteners 217 through guide slots 219 defined in roll bracket 150 such that yaw plate 152 is shiftable relative to roll bracket 150 and extension arm 106 in an arcuate path defined by guide slots 219, thereby providing yaw adjustment for projector 102. It will be appreciated that, with proper tolerances, guide slots 219 may be straight or other shape, so long as generally arcuate yawing motion of yaw plate 152 relative to pitch bracket 150 is facilitated. It will also be appreciated that guide slots 219 could be replaced with other guide structures such as closed channels while remaining within the scope of the invention. At least one 230 of fasteners 204 may be selectively adjustable as to tightness so as to add or remove friction from the sliding connection between yaw plate 152 and roll bracket 150 as desired.

Yaw plate 152 rotatably receives yaw adjustment control 218 through an aperture defined therein. Yaw adjustment control 218 generally includes knob 220, which is fixed to shaft 222, which in turn is fixed to gear 224. Gear housing 226 is pinned to yaw plate 152 with pins 228, and shaft 222 is rotatably received through an aperture in gear housing 226. As depicted in FIG. 7, gear 224 is meshed with gear teeth 229 defined in a lateral edge of plate portion 196. As knob 220 is rotated, gear 224 rotates, and due to the meshing of gear 224 with gear teeth 229, yaw plate 152 shifts along the arcuate path defined by arcuate guide slots 219, thereby finely adjusting the yaw position of a projector 102 coupled with projector positioning head 108 relative to a projection screen on wall 120.

Yaw plate 152 is attached to the top side of egg crate mounting plate 110 at any desired position, and projector 102 can likewise be attached to the bottom side of egg crate mounting plate 110 at any desired position.

Further general details of the pitch, roll, and yaw adjustment, as well as details of how the device can be made self-balancing through configuration of the various components can be found in U.S. Pat. No. 8,297,578, hereby fully incorporated herein by reference.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. §112(f) are not to be invoked unless the specific terms "means for" or "step for" are recited in a claim.

What is claimed is:

1. A mount for a projector comprising:
    a wall interface;
    a projector positioning head; and
    an elongate arm operably coupling the wall interface and the projector positioning head, a first end of the arm coupled to the wall interface, the projector positioning head operably coupled proximate an opposing second end of the arm such that the projector positioning head is shiftable along a longitudinal axis of the arm, the arm further comprising a positioning mechanism having a rotatable control coupled with a gear defining a plurality of teeth, the arm defining an elongate slot, an edge of the slot defining a plurality of gear teeth arranged in a straight line, the teeth of the gear engaged with the gear teeth defined in the edge of the slot, wherein the projector positioning head shifts along the elongate arm as the control is rotated the positioning mechanism arranged to selectively drive shifting of the projector positioning head along the longitudinal axis of the arm upon rotation of the control.

2. The mount of claim 1, wherein the projector positioning head comprises a carrier, a first bracket operably coupled to the carrier such that the first bracket is rotatable about a first axis, and a second bracket operably coupled to the first bracket such that the second bracket is rotatable about a second axis oriented transverse to the first axis.

3. The mount of claim 2, wherein the projector positioning head further comprises a second positioning mechanism arranged to selectively drive rotation of the first bracket about the first axis, and a third positioning mechanism arranged to selectively drive rotation of the second bracket about the second axis.

4. The mount of claim 3, wherein the projector positioning head further comprises a third bracket operably coupled to the second bracket such that the third bracket is rotatable about a third axis oriented transverse to both the first axis and the second axis.

5. The mount of claim 4, wherein the projector positioning head further comprises a fourth positioning mechanism arranged to selectively drive rotation of the third bracket about the third axis.

6. The mount of claim 1, further comprising a vertical positioning mechanism operably coupled to the arm and the wall interface, the vertical positioning mechanism arranged to selectively vertically shift the arm relative to the wall interface.

7. A projector system comprising:
a projector; and
a mount for attaching the projector to a wall, the mount comprising:
  a wall interface;
  a projector positioning head attached to the projector; and
  an elongate arm operably coupling the wall interface and the projector positioning head, a first end of the arm coupled to the wall interface, the projector positioning head operably coupled proximate an opposing second end of the arm such that the projector positioning head is shiftable along a longitudinal axis of the arm, the arm further comprising a positioning mechanism having a rotatable control coupled with a gear defining a plurality of teeth, the arm defining an elongate slot, an edge of the slot defining a plurality of gear teeth arranged in a straight line, the teeth of the gear engaged with the gear teeth defined in the edge of the slot, the positioning mechanism arranged to selectively drive shifting of the projector positioning head along the longitudinal axis of the arm upon rotation of the control.

8. The mount of claim 7, wherein the projector positioning head comprises a carrier, a first bracket operably coupled to the carrier such that the first bracket and the projector are rotatable about a first axis, and a second bracket operably coupled to the first bracket such that the second bracket and the projector are rotatable about a second axis oriented transverse to the first axis.

9. The system of claim 8, wherein the projector positioning head further comprises a second positioning mechanism arranged to selectively drive rotation of the first bracket and the projector about the first axis, and a third positioning mechanism arranged to selectively drive rotation of the second bracket and the projector about the second axis.

10. The system of claim 9, wherein the projector positioning head further comprises a third bracket operably coupled to the second bracket such that the third bracket and the projector are rotatable about a third axis oriented transverse to both the first axis and the second axis.

11. The system of claim 10, wherein the projector positioning head further comprises a fourth positioning mechanism arranged to selectively drive rotation of the third bracket and the projector about the third axis.

12. The system of claim 7, further comprising a vertical positioning mechanism operably coupled to the arm and the wall interface, the vertical positioning mechanism arranged to selectively vertically shift the arm and the projector relative to the wall interface.

13. A mount for a projector comprising:
a wall interface;
a projector positioning head; and
an elongate arm operably coupling the wall interface and the projector positioning head, a first end of the arm coupled to the wall interface, the projector positioning head operably coupled proximate an opposing second end of the arm such that the projector positioning head is shiftable along a longitudinal axis of the arm, the arm further comprising a positioning mechanism having a rotatable control coupled with a gear defining a plurality of teeth, the arm defining an elongate slot, an edge of the slot defining a plurality of gear teeth arranged in a straight line, the teeth of the gear engaged with the gear teeth defined in the edge of the slot, the positioning mechanism arranged to selectively drive shifting of the projector positioning head along the longitudinal axis of the arm upon rotation of the control, the projector positioning head comprising a carrier, a pitch bracket operably coupled to the carrier such that the pitch bracket is rotatable about a pitch axis, and a roll bracket operably coupled to the pitch bracket such that the roll bracket is rotatable about a roll axis oriented transverse to the pitch axis.

14. The mount of claim 13, wherein the projector positioning head further comprises a second positioning mechanism arranged to selectively drive rotation of the pitch bracket about the pitch axis, and a third positioning mechanism arranged to selectively drive rotation of the roll bracket about the roll axis.

15. The mount of claim 13, wherein the gear is rotatably coupled to the carrier and coupled to the rotatable control.

16. The mount of claim 13, further comprising a vertical positioning mechanism operably coupled to the arm and the wall interface, the vertical positioning mechanism arranged to selectively vertically shift the arm relative to the wall interface.

* * * * *